(12) United States Patent
Patterson

(10) Patent No.: US 8,040,113 B2
(45) Date of Patent: Oct. 18, 2011

(54) FAULT TOLERANT GENERATOR OR STARTER/GENERATOR WITH LOW TORQUE RIPPLE

(75) Inventor: Stanley C. Patterson, Fall City, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 481 days.

(21) Appl. No.: 12/360,641

(22) Filed: Jan. 27, 2009

(65) Prior Publication Data

US 2010/0188055 A1    Jul. 29, 2010

(51) Int. Cl.
*H02P 11/00* (2006.01)
(52) U.S. Cl. .......................................... 322/37; 322/17
(58) Field of Classification Search ............... 322/8, 17, 322/37, 39, 45–46, 75
See application file for complete search history.

(56) References Cited

U.S. PATENT DOCUMENTS

| | | | | |
|---|---|---|---|---|
| 4,492,874 | A * | 1/1985 | Near | 290/40 B |
| 4,933,623 | A * | 6/1990 | Fox | 322/25 |
| 6,728,601 | B2 * | 4/2004 | Garcia et al. | 700/286 |
| 6,909,263 | B2 * | 6/2005 | Xu et al. | 322/29 |
| 7,064,526 | B2 | 6/2006 | Patterson | |
| 7,201,244 | B2 * | 4/2007 | Johnston et al. | 180/65.51 |
| 7,242,167 | B2 | 7/2007 | Patterson | |
| 7,365,521 | B2 | 4/2008 | Patterson | |
| 7,375,499 | B2 * | 5/2008 | Maddali et al. | 322/28 |

* cited by examiner

*Primary Examiner* — Thanh Lam
(74) *Attorney, Agent, or Firm* — Wiggin and Dana LLP

(57) ABSTRACT

A fault tolerant generator apparatus includes subsystems isolated from each other, so that the generator may operate in a fault mode with low torque ripple. The apparatus comprises a machine and a power controller unit. In an embodiment, the machine has a plurality of electrical three phase windings and the power controller unit has a plurality of power converters. Each three phase winding of the machine is coupled to a separate corresponding power converter to form an operating subsystem. The operating subsystems are physically and electrically isolated from each other to provide fault tolerant operation of the apparatus. Accordingly, each of the operating subsystems is effective to provide a balanced electrical load for the machine.

20 Claims, 2 Drawing Sheets

FAULT TOLERANT GENERATOR OR STARTER/GENERATOR WITH LOW TORQUE RIPPLE

FIELD OF THE DISCLOSURE

This disclosure relates to generator and starter/generator systems for small engine applications, particularly in applications where fault-tolerant operation is desired.

BACKGROUND OF THE DISCLOSURE

Fault tolerant capability (that is, the ability to continue to operate, at full or reduced capacity, in the presence of a fault within one or more elements) is often required in generator or starter/generator systems used in applications requiring a high level of reliability. A typical generator system 1, shown schematically in FIG. 1, includes a machine (e.g. a permanent magnet alternator or PMA) 2 coupled to a power controller (e.g. power conversion unit or PCU) 3, which provides DC output power at terminals 5. Fault tolerant subsystems may be implemented by configuring one or more functions within the machine and/or the power controller with redundant or multiple elements. Fault tolerant system architectures, including use of multiple isolated windings, incorporating redundancy in the machine and/or the power controller/converter functions, etc. are described in more detail in U.S. Pat. No. 7,064,526 (assigned to the same assignee as the present disclosure), the entire disclosure of which is incorporated herein by reference.

When one of these elements is disabled, such as an open winding fault within a single phase of the machine stator, the generator or starter/generator function is then provided using the redundant element. When operating in this fault mode, the machine loads are typically unbalanced, which can result in significant levels of torque ripple. The high levels of torque ripple can cause damage to the machine, its drive system and/or the prime mover.

Accordingly, there is a need for a fault tolerant generator or starter/generator system which exhibits low torque ripple when operating in a fault mode.

SUMMARY OF THE DISCLOSURE

The present disclosure provides a fault tolerant generator including subsystems isolated from each other, so that the generator may operate in a fault mode with low torque ripple.

According to a first aspect of the disclosure, an apparatus comprises a machine and a power controller unit; the machine has a plurality of electrical phases and the power controller unit has a plurality of power converters. Each phase of the machine is coupled to a separate corresponding power converter to form an operating subsystem. The operating subsystems are physically and electrically isolated from each other to provide fault tolerant operation of the apparatus. Accordingly, each of the operating subsystems is effective to provide a balanced electrical load for the machine.

According to another aspect of the disclosure, an apparatus comprises a machine and a power conversion unit (PCU). The machine includes one of a permanent magnet alternator (PMA), a DC generator, an AC generator, and a DC motor; the machine has a plurality of subsystems. The PCU is coupled to the machine, and includes a plurality of full-wave rectifiers, each coupled to a separate machine subsystem; a plurality of input filters each coupled to a separate one of the full-wave rectifiers; a plurality of power converters each coupled to a separate one of the input filters; and an output filter coupled to the power converters. Each of the machine subsystems forms an operating subsystem with its corresponding full-wave rectifier, input filter and power converter. The operating subsystems are physically and electrically isolated from each other to provide fault tolerant operation of the apparatus. Accordingly, each of the operating subsystems is effective to provide a balanced electrical load for the machine.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
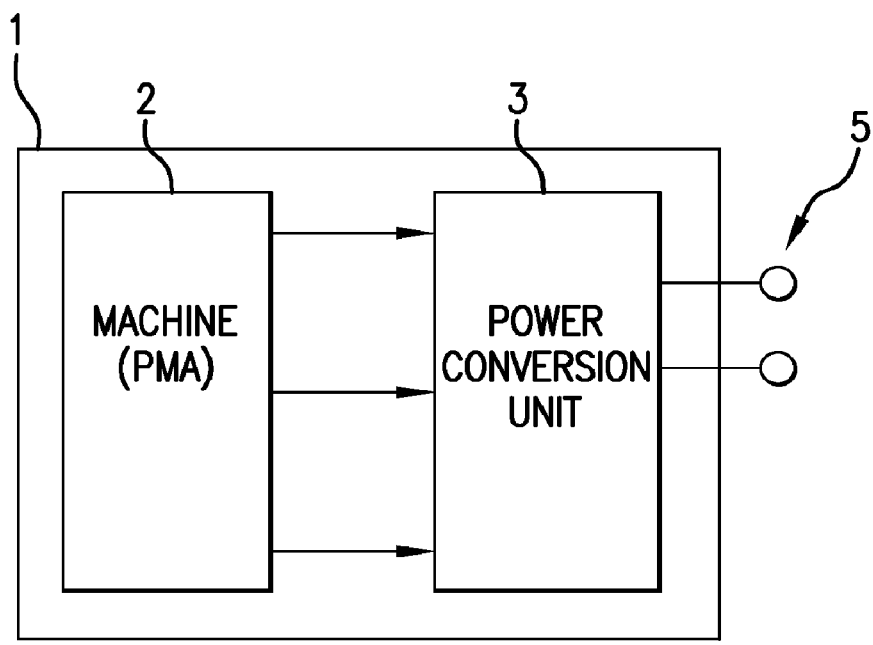
FIG. 1 is a schematic illustration of a typical generator system including a machine and a power controller.
Figure 2:
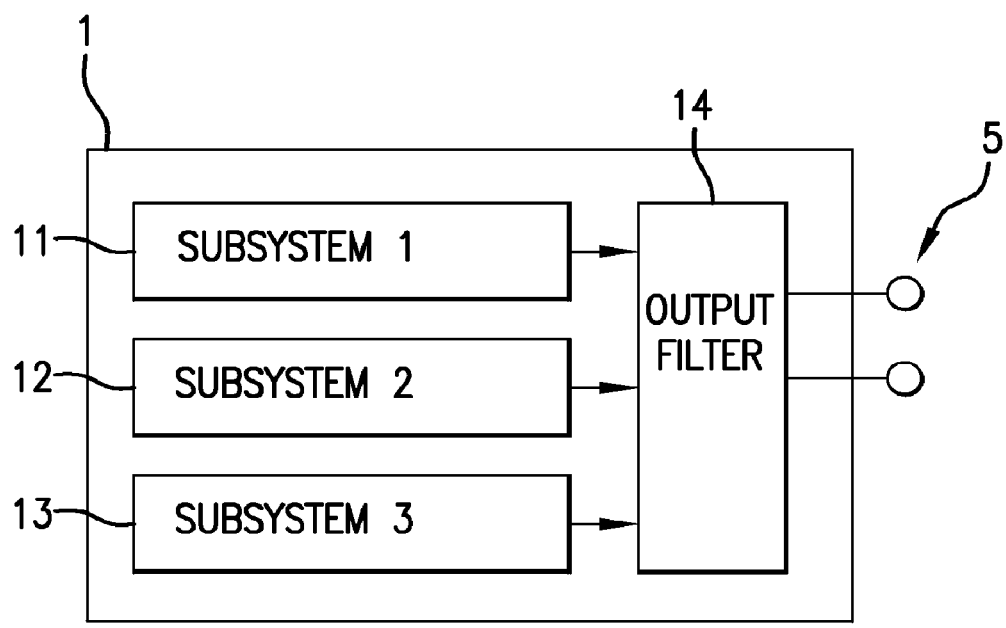
FIG. 2 is a schematic illustration of a generator system having multiple converter subsystems which are electrically and physically isolated, in accordance with an embodiment of the disclosure.

As shown schematically in FIG. 2, a fault tolerant generator 1 embodying the disclosure includes multiple operating subsystems 11-13 connected to an output filter 14, with DC output power delivered to terminals 5. The subsystems 11-13 are electrically and physically isolated from each other. In this embodiment, the subsystems include separate phases of a machine (e.g. a PMA) and a converter in a power controller unit (PCU), as detailed below.

Figure 3:
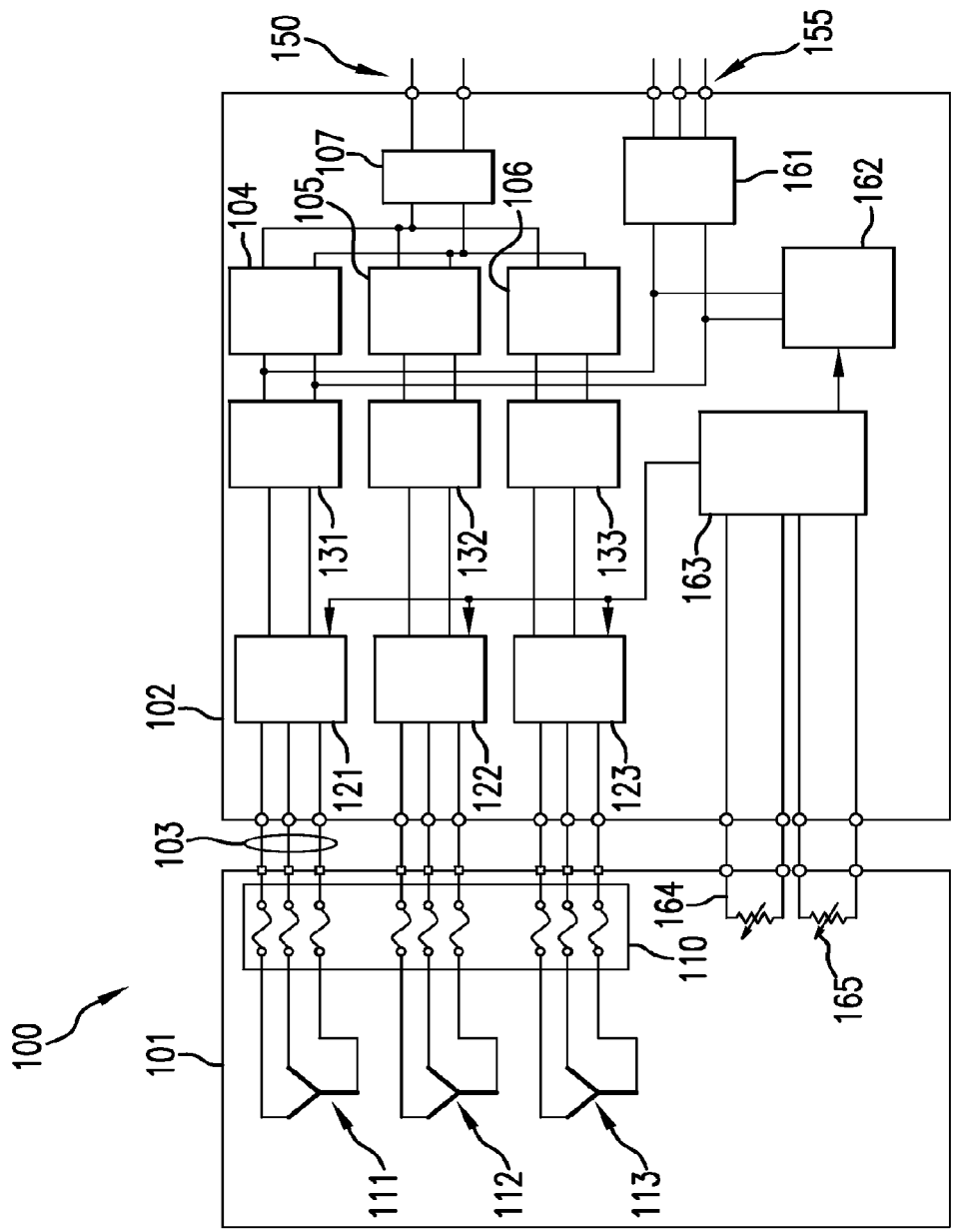
FIG. 3 is a schematic block diagram of a fault tolerant starter/generator system with low torque ripple, in accordance with an embodiment of the disclosure.

A simplified block diagram of a fault tolerant generator or starter/generator system 100, in accordance with an embodiment of the disclosure, is illustrated in FIG. 3. Each phase of the machine (PMA) 101 and power controller (PCU) 102 is electrically and physically isolated. The PMA has three three-phase windings 111-113, coupled to the PCU 102 by connectors 103 through an array of fuses 110. The PCU provides regulated DC output power at terminals 150. In this embodiment, the output is 270 VDC, but may be some other value. The PCU is capable of operation even in the presence of multiple faults.

In this example, the PMA and PCU are configured with three generator and converter subsystems. Each PMA/PCU converter subsystem is implemented using a three phase winding in the PMA and an independent converter in the PCU. Windings 111-113 are connected to full-wave rectifiers 121-123 respectively, which are connected to input filters 131-133. Each input filter is connected to a separate buck-boost converter 104-106. The outputs of converters 104-106 respectively are fed into output filter 107, which is connected to output terminals 150.

If a fault on one converter subsystem occurs, such as an open winding in PMA winding 111 or an open fuse 110, then that subsystem is disabled. The other two subsystems (winding 112 connected to filter/converter subsystem 122/133/105, and winding 113 connected to filter converter subsystem 123/

133/106) continue to operate. Each of the operating subsystems is a balanced, three phase load for the PMA; accordingly, the torque ripple is nearly zero.

If an additional fault occurs on another subsystem, such as the rectifier 122 for the PMA winding 112, then that entire subsystem is also disabled. However, the generator system 100 is still able to provide output power with very low torque ripple, since the load continues to be balanced. The PMA/PCU subsystems may be designed to each provide a portion (or all) of the output capacity to accommodate the specific requirements of the application when the system 100 operates in fault mode. More generally, the machine and/or the power controller may be designed such that operation at full or reduced capacity is maintained even in the event of failure of up to n−1 phases of an n-phase subsystem.

In the embodiment shown in FIG. 3, the PCU 102 also incorporates a fault monitor and control subsystem that may be utilized to implement fail safe control features such as overheat protection, shaft shear protection, etc. This subsystem includes a fault monitor 163 with a switch control for switching off the rectifiers 121-123; thermistors 164, 165 in the PMA 101; and a shaft shear control 162. Shaft shear control 162 is coupled to a full-wave rectifier and filter circuit 161, which has as input three-phase 115 VAC power at terminals 155. The fault monitor and control subsystem is effective to disable any of the converter subsystems where a fault occurs.

It will be appreciated that since the machine and/or the power controller may be designed so that each phase is physically and electrically isolated, a failure in one power converter stage will not propagate to or degrade the generator or starter/generator performance of other power converters.

The machine and/or power controller may also be designed to continuously monitor for and detect a ground fault condition within any phase of the subsystem. The ground fault detection function can be implemented so that it is fully testable upon command, so that a complete end-to-end functionality verification of the ground fault detection circuit is performed upon command.

In an embodiment, the machine 101 may be configured without bearings using a gearbox integrated design. The power controller 102 may use multiple, parallel solid-state switching devices to ensure high performance and high reliability operation, as well as fault tolerant operability within each converter stage.

The system 100 is applicable for generators and/or starter/generators utilizing a number of machine design alternatives, including permanent magnet, AC induction, DC motor, switched reluctance and universal motor configurations. Applications may generally include aircraft or automotive applications requiring engine start operation and generation of DC and/or AC electrical power.

In alternative embodiments, the PCU 102 may include a single assembly or multiple assemblies, located either adjacent to or remote from a machine. When the PCU is coupled to a motor, the PCU/motor interconnection may be via a low current feeder cable (where the motor/generator voltage is greater than the average bus voltage), or via a high current feeder cable (where the motor/generator voltage is equal to or less than the average bus voltage).

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. An apparatus comprising a machine and a power controller unit, wherein
the machine has a plurality of electrical phases and the power controller unit has a plurality of power converters, each phase of the machine being coupled to a separate corresponding power converter to form an operating subsystem,
the operating subsystems are physically and electrically isolated from each other to provide fault tolerant operation of the apparatus, and
each of the operating subsystems is effective to provide a balanced electrical load for the machine.

2. An apparatus according to claim 1, wherein
the apparatus provides electrical power and has an output capacity,
the apparatus operates in a fault mode in accordance with at least one of the operating subsystems being disabled, and
the apparatus provides power in accordance with at least a portion of the output capacity while operating in the fault mode.

3. An apparatus according to claim 2, wherein the apparatus provides DC electrical power.

4. An apparatus according to claim 2, wherein the machine has n phases and the apparatus has n operating subsystems, and the apparatus is effective to provide power at reduced capacity when n−1 operating subsystems are disabled.

5. An apparatus according to claim 1, further comprising:
a fault monitor system; and
a control system,
wherein the control system is effective to disable any of the operating subsystems in accordance with detection of a fault therein.

6. An apparatus according to claim 5, wherein the fault monitor system performs ground fault detection.

7. An apparatus according to claim 1, wherein the machine comprises a permanent magnet alternator (PMA) having a plurality of three-phase windings, and each of the operating subsystems comprises a balanced three-phase load for the PMA.

8. An apparatus according to claim 1, wherein the power controller unit (PCU) comprises a plurality of power converters, each power converter being coupled to a separate input filter and to an output filter.

9. An apparatus according to claim 8, wherein each input filter is coupled to a separate full-wave rectifier.

10. An apparatus according to claim 9, wherein each rectifier includes a switch, and further comprising:
a fault monitor system; and
a control system,
wherein the control system is coupled to each of the switches and is effective to switch off a rectifier in accordance with detection of a fault within the operating subsystem including said rectifier.

11. An apparatus comprising:
a machine including one of a permanent magnet alternator (PMA), a DC generator, an AC generator, and a DC motor, the machine having a plurality of subsystems; and
a power conversion unit (PCU) coupled to the machine, the PCU including
a plurality of full-wave rectifiers, each rectifier coupled to a separate machine subsystem,
a plurality of input filters each coupled to a separate one of the full-wave rectifiers, a plurality of power converters each coupled to a separate one of the input filters, and
an output filter coupled to the power converters,
wherein
each of the machine subsystems forms an operating subsystem with its corresponding full-wave rectifier, input filter and power converter,
the operating subsystems are physically and electrically isolated from each other to provide fault tolerant operation of the apparatus, and
each of the operating subsystems is effective to provide a balanced electrical load for the machine.

12. An apparatus according to claim 11, wherein the machine is a PMA having a plurality of three-phase windings.

13. An apparatus according to claim 11, wherein the machine further includes an array of fuses through which the PCU is coupled to the machine.

14. An apparatus according to claim 11, wherein
the apparatus provides electrical power and has an output capacity,
the apparatus operates in a fault mode in accordance with at least one of the operating subsystems being disabled, and
the apparatus provides power in accordance with at least a portion of the output capacity while operating in the fault mode.

15. An apparatus according to claim 12, wherein each of the operating subsystems comprises a balanced three-phase load for the PMA.

16. An apparatus according to claim 11, further comprising:
a fault monitor system; and
a control system coupled to each of the full-wave rectifiers and to the machine,
wherein the control system is effective to disable any of the operating subsystems in accordance with detection of a fault therein.

17. An apparatus according to claim 16, wherein the fault monitor system performs ground fault detection.

18. An apparatus according to claim 16, wherein each full-wave rectifier includes a switch, and the control system is coupled to each of the switches and is effective to switch off a full-wave rectifier in accordance with detection of a fault within the operating subsystem including said full-wave rectifier.

19. An apparatus according to claim 11, wherein the apparatus provides DC electrical power.

20. An apparatus according to claim 11, wherein the machine is an engine starter motor.

* * * * *